Aug. 25, 1931.  A. H. PALMBUSH  1,820,485

DETACHABLE MILK PAIL HOLDER

Filed March 7, 1930

Inventor:
Andrew H. Palmbush
by Lester Sargent
Atty.

Patented Aug. 25, 1931

1,820,485

UNITED STATES PATENT OFFICE

ANDREW H. PALMBUSH, OF CONRAD, MONTANA

DETACHABLE MILK PAIL HOLDER

Application filed March 7, 1930. Serial No. 434,098.

The object of my invention is to provide a novel device for supporting milk pails conveniently, safely and without unnecessary exertion on the part of the person doing the milking and particularly to provide a device of simple construction which can be readily applied to and detached from the milking pail. I attain these and other objects of my invention by the device illustrated in the accompanying drawings,—

Like numerals designate like parts in each of the several views.

Figure 1:
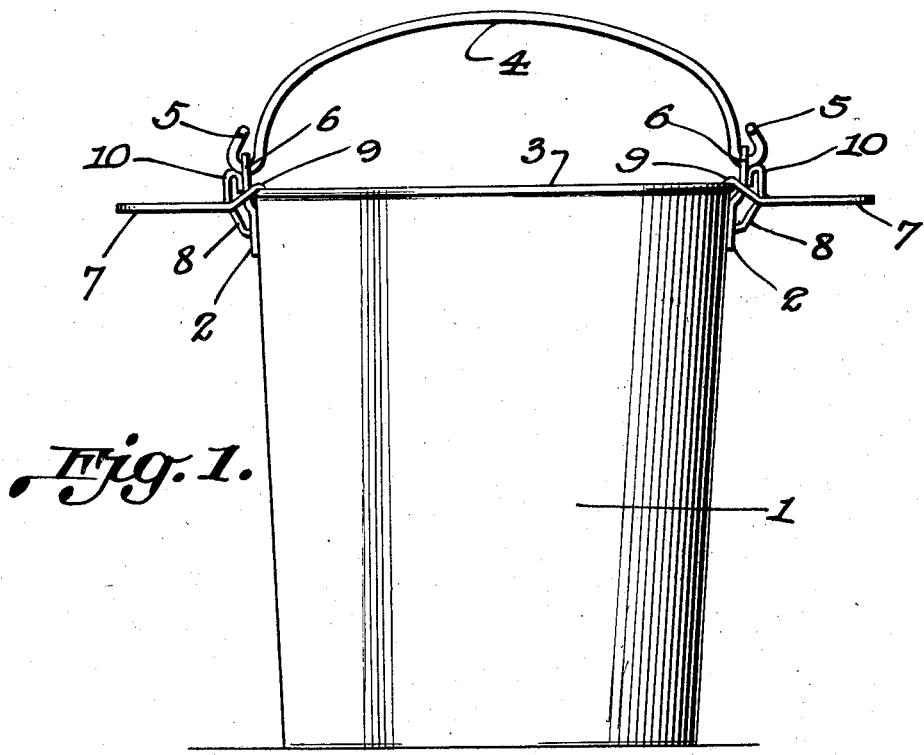
Fig. 1 is a side elevation of my invention.
Figure 2:
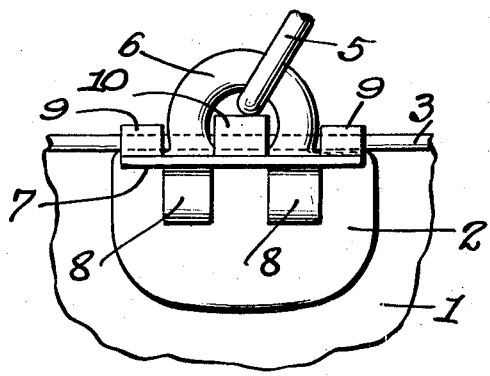
Fig. 2 is a detail front or edge view of the device applied to the pail.

Referring to the accompanying drawings, I provide a plate 7 having a U-shaped tongue 10 disposed at right angles to the plate which functions as an abutment member to rest against the ear 6 to which the loop end 5 of the bail 4 is attached. I also provide spaced downwardly extending tongues 8 the ends of which abut against the outside of the pail, as shown in Fig. 1. I also provide spaced tongue hooks 9 adapted to engage over the edge of the head or rim 3 of pail 1, as shown in Figs. 1 and 2.

Figure 3:
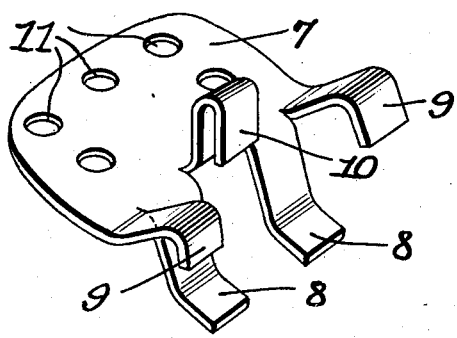
Fig. 3 is a perspective view of one of the devices detached from the pail.

In use the devices are used in pairs, as shown in Fig. 3, and each has its tongue hooks seated over the rim of the pail, with the ends of the downwardly extending tongues 8 abutting against the outside of the pail and the central abutting tongue 10 resting against the ear 6 of the pail as shown in Fig. 1. The devices may be readily taken off or applied to the pail by hooking or unhooking them from the pail by tilting them to or from the horizontal position illustrated. In this position they provide a secure fastening element, the abutment member 10 resting against the ear 6 of the pail while the tongues 8 engage the outside portions of the pail as shown in Fig. 1. I may provide one or more apertures 11 in the plate 7, to serve both as a means for conveniently hanging the devices on a nail when they are not in use, and also to reduce the amount of material necessary for making them.

What I claim is:

1. In a device of the class described, a pair of readily detachable milk pail holders releasably engaging over the edge of the rim of the milk pail each of said members comprising a plate, a U-shaped tongue abutting against the ear of the pail, tongue hooks engaging over the rim of the pail and downwardly depending tongues having their ends abutting against the outside of the pail.

2. As a new article of manufacture a milk pail holder comprising a plate, a tongue formed at right angles to the plate and adapted to abut against the ear of a milk pail spaced tongues integral with the plate and adaptable to engage over the rim of a milk pail, and downward depending tongues having their ends disposed to abut against the outside of the pail.

ANDREW H. PALMBUSH.